July 29, 1941.　　　　E. C. TANNER　　　　2,250,612

REFRIGERATING APPARATUS

Filed March 31, 1939

WITNESSES:

INVENTOR
ELO C. TANNER.
BY
ATTORNEY

Patented July 29, 1941

2,250,612

UNITED STATES PATENT OFFICE 2,250,612

REFRIGERATING APPARATUS

Elo C. Tanner, Springfield, Mass., assignor to Westinghouse Electric & Manufacturing Company, East Pittsburgh, Pa., a corporation of Pennsylvania Application March 31, 1939, Serial No. 265,242

8 Claims. (Cl. 62—103)

This invention relates to refrigerating apparatus and more especially to dry coolers for bottled beverages such as used by stores vending such bottled beverages.

One object of the invention is to provide a cooler for bottled beverages and the like which has a large overload capacity for an appreciable period of time.

Another object of the invention is to provide a cooler for bottled beverages and the like which may be refrigerated by a relatively small refrigerating unit.

A further object is to provide a refrigerator in which the refrigerating machinery may be inserted or replaced without disconnecting or opening any of the refrigerant passages.

These and other objects are effected by my invention as will be apparent from the following description and claims taken in connection with the accompanying drawing, forming a part of this application, in which:

Figure 1:
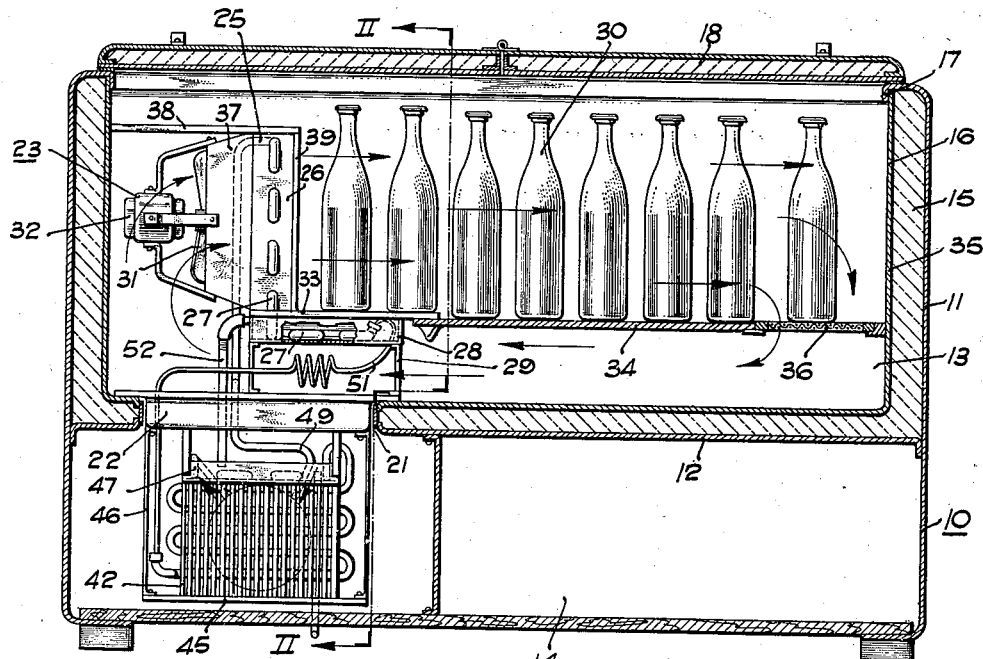
Fig. 1 is a vertical section of the refrigerating apparatus.
Figure 2:
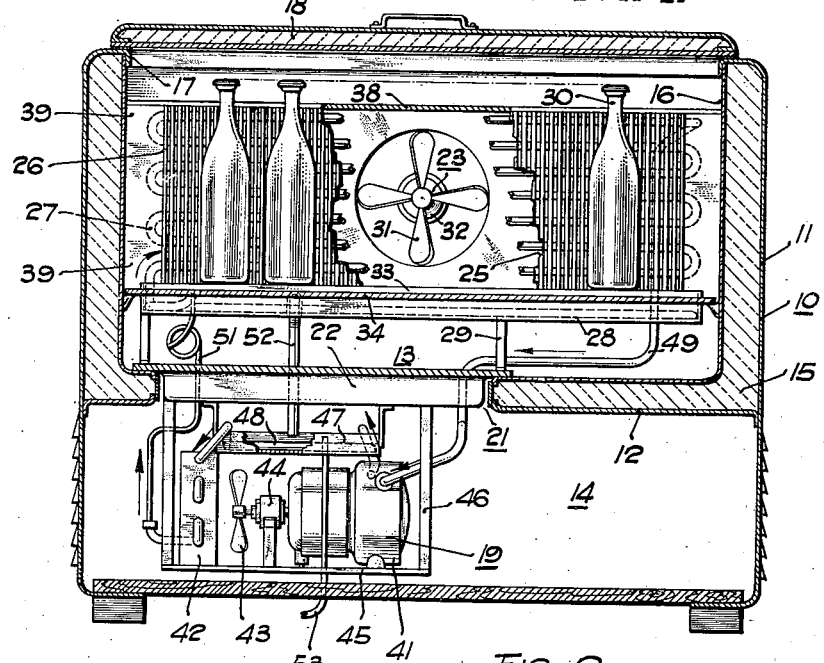
Fig. 2 is a section of the apparatus taken on the line II—II of Fig. 1 with parts of the evaporator broken away.

Referring particularly to the drawing for a detailed description of the invention, the reference 10 designates a rectangular cabinet comprising an outer shell 11, a horizontal partition 12 therein dividing said cabinet into an upper compartment 13 and a lower compartment 14.

The upper compartment 13 is lined with insulating material 15 and provided with an inner liner 16 joined at its upper edges to inturned flanges 17 of the outer shell 11. A hinged cover 18 is also provided for the upper compartment 13. The upper compartment 13 of the refrigerator forms a storage chamber for the articles to be refrigerated and the lower compartment 14 houses the refrigerating mechanism 19.

The partition 12, together with the insulating material 15, and the bottom of the liner 16 is provided with an opening 21 which is closed by a removable plug 22 to which both an evaporator mechanism 23 in the upper compartment 13 and the refrigerating mechanism 19 in the lower compartment 14 are attached so that the entire refrigerating machinery 19 and 23 together with the plug 22 may be lifted from the refrigerating cabinet 10 as a unit.

The evaporator mechanism 23 in the upper compartment comprises a vertical evaporator 25 comprising parallel and spaced-apart metal plates 26 through which a refrigerant-carrying tube 27 is passed back and forth. The evaporator 25 is supported on a receptacle 28 with the lower edge of the evaporator 25 dipping into the receptacle 28 to effect contact with water therein. The refrigerant tube 27 is also continued through the receptacle 28 in a serpentine path and forms a part of the evaporator 25. The receptacle 28 is carried on supports 29 spaced above the plug 22 and a fan 31 driven by the motor 32 is located on one side of the evaporator 25 to blow air therethrough. The portion of the receptacle 28 not occupied by the evaporator 25 is covered by a platform 33 and a second platform 34 at approximately the same level is secured to the walls of the inner liner 16. The platform 34 extends nearly to the end wall 35 of the upper compartment 13 where it is replaced by a screen 36. The platforms 33 and 34 and the screen 36 provide a support for the storage of bottled beverages 30.

Air is circulated in the upper compartment 13 by the fan 31 and passes through the evaporator 25 over the bottles 30 on the platforms 33 and 34 and the screen 36, through the screen 36, through the space below the platforms 33 and 34 and receptacle 28 and to the rear of the fan 31. A shroud 37 surrounding the fan and baffles 38 and 39 around the evaporator 25 establish the flow of air in this path.

The refrigerating mechanism 19 below the plug 22 comprises a motor-driven compressor (not shown) in a sealed casing 41, a condenser 42 and a fan 43 driven by a motor 44 for drawing air through the condenser 42 and passing it over the sealed casing 41. This refrigerating unit may be of the general type described in Patent No. 2,101,881 issued December 14, 1937 to Matson C. Terry. The condenser 42, the casing 41, and the motor 44 are supported on a platform 45 suspended from the plug 22 by hangers 46. A pan 47 is suspended immediately above the refrigerating mechanism 19 and a conduit 48 carrying hot compressed refrigerant vapor from the compressor to the condenser 42 passes through the pan 47 to be coiled by water located therein. A suction conduit 49 connects the evaporator 25 with the casing 41 and a capillary restricting tube 51 connects the bottom of the condenser 42 with the entrance end of the tube 27 in the receptacle 28.

The operation of the refrigerating machinery 19 and 23 at normal loads is such that moisture condensed from the circulated air on the evaporator 25 does not freeze permanently to the evaporator 25 but drips down into the receptacle 28. This receptacle 28 is sheltered from the air circulated by the fan 31 and during normal operation of the refrigerator the water collected therein freezes because the relatively warm circulating air does not strike the water. Surplus water, beyond the capacity of the receptacle 28 will drain through a duct 52 into the pan 47. The duct 52 is located at the evaporator end of the receptacle 28 which is the warmest portion and will therefore be the portion last to freeze and first to melt. The opening to the duct 52 is, therefore, not likely to be clogged by ice when surplus water accumulates in the receptacle 28.

If an abnormally heavy load is placed on the refrigerating machinery 19 and 23, such as occurs when the cover 18 is opened frequently or when a large number of warm bottles are inserted in a short period of time, portions of the ice formed in the receptacle 28 will melt and absorb some of the heat of the upper compartment 13, thereby aiding in the refrigeration thereof. The quantity of ice thus melted will depend upon the degree of loading of the refrigerator.

The water delivered to the pan 47 will also be at a high rate when most needed, for on hot, humid days the sale of chilled beverages will be large resulting in a frequent opening of the cover 18 and therefore an admission of large amounts of humid air to the evaporator 25 and a high degree of moisture condensing thereon, which moisture, under these conditions, would not be frozen in the receptacle 28 and would largely drain into the pan 47.

The water dripping into the pan 47 will normally be evaporated by the hot refrigerant in the conduit 48. Any excessive amount of water is discharged through a drain pipe 53. Since the melting of the ice aids the refrigeration of the upper compartment 13 during peak loads, the refrigerating machinery 19 and 23 may be of less capacity than would otherwise be required.

From the above, it will be apparent that this invention provides a refrigerator which has a large overload capacity in view of the size of the mechanical refrigerating apparatus employed therein. It further provides for an economical utilization of the moisture condensed on the evaporator and provides for the insertion and replacement of the refrigerating machinery without opening any of the refrigerant passages.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In refrigerating apparatus, the combination of an insulated chamber defining a storage space, a cooling unit therein, a receptacle associated with said cooling unit to collect water condensed thereon, a portion of said cooling unit being in heat exchange relation with said receptacle to freeze water therein during light and normal refrigerating loads, said frozen water melting during heavy refrigerating loads, and means for forcibly circulating the air in said chamber over said cooling unit.

2. In refrigerating apparatus, the combination of an insulated chamber defining a storage space, a cooling unit therein, a receptable associated with said cooling unit to collect water condensed thereon, a portion of said cooling unit being located in said receptacle to freeze water therein during light and normal refrigerating loads, said frozen water melting during heavy refrigerating loads, means for forcibly circulating the air in said chamber over said cooling unit, and a drain pipe connected to said receptacle adjacent the portion of the cooling unit therein.

3. In refrigerating apparatus, the combination of an insulated chamber defining a storage space, an evaporative cooling unit therefor, a receptacle associated with said cooling unit to collect water dripping therefrom, a compressor-condenser unit of limited capacity, a portion of the cooling unit being in heat exchange relation with said receptacle to freeze water therein during light and normal loads of the apparatus, said frozen water melting to provide auxiliary refrigeration when the load on the compressor-condenser unit is more than normal and means for forcibly circulating the air in said chamber over a portion of the cooling unit not in heat exchange relationship with said water and over said receptacle.

4. In refrigerating apparatus, the combination of an insulated chamber defining a storage space, a cooling unit therefor, a receptacle below said cooling unit for collecting the condensate therefrom, a portion of said cooling unit being in heat exchange relation with the condensate in said receptacle, a pan exterior of said chamber, means for conveying excess condensate from said receptacle to said pan, condensing means having at least a portion thereof in heat exchange relation with the condensate in said pan, said apparatus being adapted to freeze condensate in said receptacle during light and normal loads and transmit heat to said frozen condensate during abnormally high loads to melt the same and said excess condensate serving to absorb heat from said condensing means and means for forcibly circulating the air in said chamber over a portion of the cooling unit not in heat exchange relationship with said condensate and over said receptacle.

5. In refrigerating apparatus, the combination of an insulating chamber defining a storage space, a cooling unit therefor, a receptacle below said cooling unit for collecting condensate therefrom, a portion of said cooling unit being in heat exchange relationship with the condensate in said receptacle, a pan exterior of said chamber, means for conveying excess condensate from said receptacle to said pan, a compressor and a condenser disposed exteriorly of said insulated chamber, a conduit for conducting compressed refrigerant from the compressor to the condenser, said conduit passing through said pan below the normal liquid level thereof, said apparatus being adapted to freeze condensate in said receptacle during the light and normal loads and transmit heat to said frozen condensate during abnormally high loads to melt the same, and said excess condensate in said pan serving to absorb heat from said conduit and means for forcibly circulating the air in said chamber over a portion of the cooling unit not in heat exchange relationship with said condensate and over said receptacle.

6. In refrigerating apparatus, the combination of an insulated chamber defining a storage space, a removable section in the bottom of said chamber, a receptacle supported above said section, a cooling unit partially in said receptacle and supported thereon, a refrigerant compressor, a refrigerant condenser and a pan suspended below said section, a conduit connecting the compressor and condenser and passing through said pan below the normal liquid level thereof, a suction conduit connecting said cooling unit and said evaporator, and a liquid refrigerant tube connecting said evaporator and said compressor, said conduits and tube passing through said removable section so that the evaporator, the receptacle, the removable section, the pan, the compressor, the condenser, the conduits, and the tube may be removed from said cabinet as a unit without disconnecting said conduits and tube.

7. In refrigerating apparatus, the combination of an insulated chamber having top, bottom and side walls, a platform in said chamber spaced from the top, bottom and from two opposite side walls to define an air circulating space around said platform, the space above said platform providing a storage space for articles to be refrigerated, a cooling unit in said circulating space, a receptacle associated with said cooling unit to collect water condensing thereon, a portion of said cooling unit being in heat exchange relationship with said receptacle to freeze water therein during light and normal refrigerating loads, said frozen water melting during heavy refrigerating loads, and means for forcibly circulating the air in said cabinet through said air circulating space.

8. In refrigerating apparatus, the combination of an insulated chamber having top, bottom, and side walls, a platform in said chamber spaced from the top, bottom, and two opposite side walls to define an air-circulating space around said platform, the space above the platform providing a storage space for articles to be refrigerated, a cooling unit and a receptacle in said air-circulating space, said receptacle being associated with said cooling unit to collect water condensing thereon, a portion of said cooling unit being in heat exchange relationship with said receptacle to freeze water therein during light and normal refrigerating loads, said frozen water melting during heavy refrigerating loads, and means for forcibly circulating the air in said chamber through said air-circulating space, said cooling unit being positioned closely adjacent said storage space and means for forcibly circulating the air in said chamber through said air-circulating space directly from the cooling unit to said storage space.

ELO C. TANNER.